United States Patent [19]

Mansfield

[11] Patent Number: 4,967,956
[45] Date of Patent: Nov. 6, 1990

[54] MULTI-COMPONENT SPRAYING SYSTEM

[75] Inventor: Gregory A. Mansfield, Zionsville, Ind.

[73] Assignee: Glas-Craft, Inc., Indianapolis, Ind.

[21] Appl. No.: 342,185

[22] Filed: Apr. 24, 1989

Related U.S. Application Data

[63] Continuation-in-part of Ser. No. 80,475, Jul. 31, 1987, Pat. No. 4,824,017, which is a continuation-in-part of Ser. No. 885,006, Jul. 14, 1986, abandoned.

[51] Int. Cl.$^5$ .......................... B05B 7/08; B05B 1/28
[52] U.S. Cl. ........................................ 239/9; 239/296; 239/414; 239/422; 239/424.5; 239/427; 239/433; 239/DIG. 8; 239/419.3
[58] Field of Search ...................... 239/8-10, 239/290, 294, 296, 299, 306, 414, 416.1, 416.3, 416.4, 417.5, 422, 424, 424.5, 427, 429, 430, 433, 599, 600, 419.3, DIG. 8, 413

[56] References Cited

U.S. PATENT DOCUMENTS

| | | | |
|---|---|---|---|
| D. 252,097 | 6/1979 | Probst et al. | D23/17 |
| 2,780,496 | 2/1957 | Asbeck et al. | 299/140.1 |
| 2,864,653 | 12/1958 | Liedberg et al. | 299/140 |
| 3,033,472 | 5/1962 | Shelton | 239/408 |
| 3,202,363 | 8/1965 | Kautz et al. | 239/413 |
| 3,330,484 | 7/1967 | Johnson et al. | 239/414 |
| 3,399,834 | 9/1968 | Bradley | 239/10 |
| 3,521,824 | 7/1970 | Wilcox | 239/424.5 |
| 3,542,296 | 11/1970 | Bradley | 239/306 |
| 3,589,621 | 6/1971 | Bradley | 239/526 |
| 3,635,400 | 1/1972 | Nord et al. | 239/15 |
| 3,709,468 | 1/1973 | Ives | 259/4 |
| 3,759,450 | 9/1973 | Fram et al. | 239/427 |
| 3,763,876 | 10/1973 | Freeman et al. | 137/114 |
| 3,788,555 | 1/1974 | Harrison et al. | 239/336 |
| 3,799,403 | 3/1974 | Probst et al. | 222/135 |
| 3,843,052 | 10/1974 | Cowan | 239/3 |
| 3,893,621 | 7/1975 | Johnson | 239/9 |
| 4,123,007 | 10/1978 | Gardner | 239/414 |
| 4,325,513 | 4/1982 | Smith et al. | 239/416.1 X |
| 4,386,739 | 6/1983 | Kwok | 239/296 |
| 4,618,098 | 10/1986 | Hedger, Jr. et al. | 239/290 |
| 4,713,257 | 12/1987 | Luttermoller | 427/27 |
| 4,767,057 | 8/1988 | Degli et al. | 239/296 |
| 4,824,017 | 4/1989 | Mansfield | 239/9 |

FOREIGN PATENT DOCUMENTS

| | | |
|---|---|---|
| 735983 | 8/1955 | United Kingdom . |
| 3505618 | 11/1987 | Fed. Rep. of Germany . |
| 57-90762 | 6/1982 | Japan . |

OTHER PUBLICATIONS

Glas-Craft, Inc., LPA Low Pressure Airless Product Sheet.
Glas-Craft, Inc., ISD Spray Up System Product Sheet.

Primary Examiner—Andres Kashnikow
Assistant Examiner—William Grant
Attorney, Agent, or Firm—Willian Brinks Olds Hofer Gilson & Lione

[57] ABSTRACT

An air-assisted, airless atomization, plural component spraying system and method includes a first source of a first component, e.g., a resin; a second source of a second component, e.g., catalyst for the resin; spraying means to mix the resin and catalyst and direct the mixture to a substrate and a source of compressed air. The spraying means includes a nozzle assembly which comprises a liquid nozzle for forming liquid into a fan-like film with expanding edges extending from a liquid orifice, and a nozzle assembly for directing a flow of compressed air and catalyst at the fan-like film closely adjacent the liquid orifice. In an internal mix system, compressed air is directed to impinge upon the expanding edges of the fan-like stream of mixed resin and catalyst downstream of the impingement of a flow of compressed air on the fan-like stream to capture particles in small, uniform spray pattern.

27 Claims, 9 Drawing Sheets

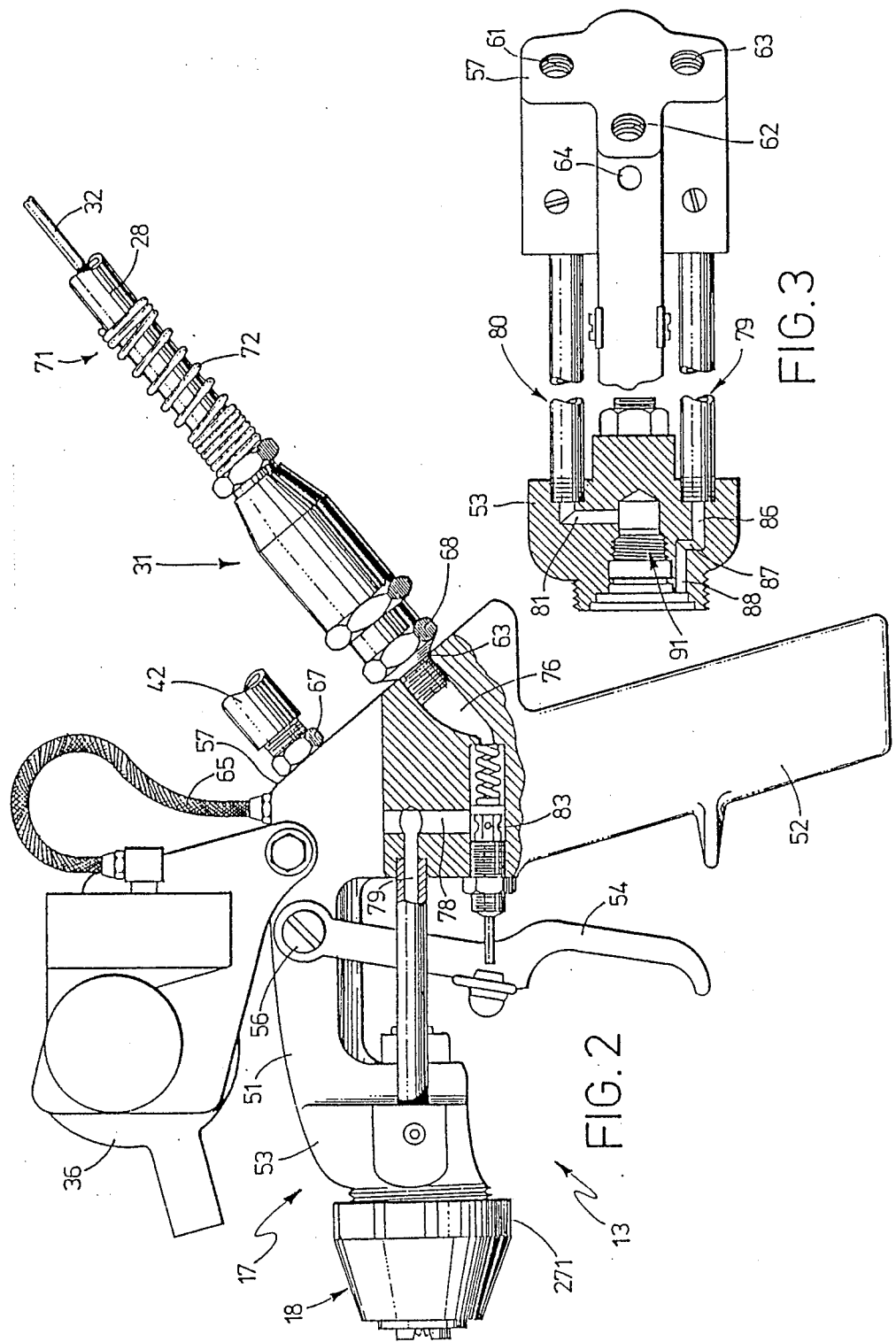

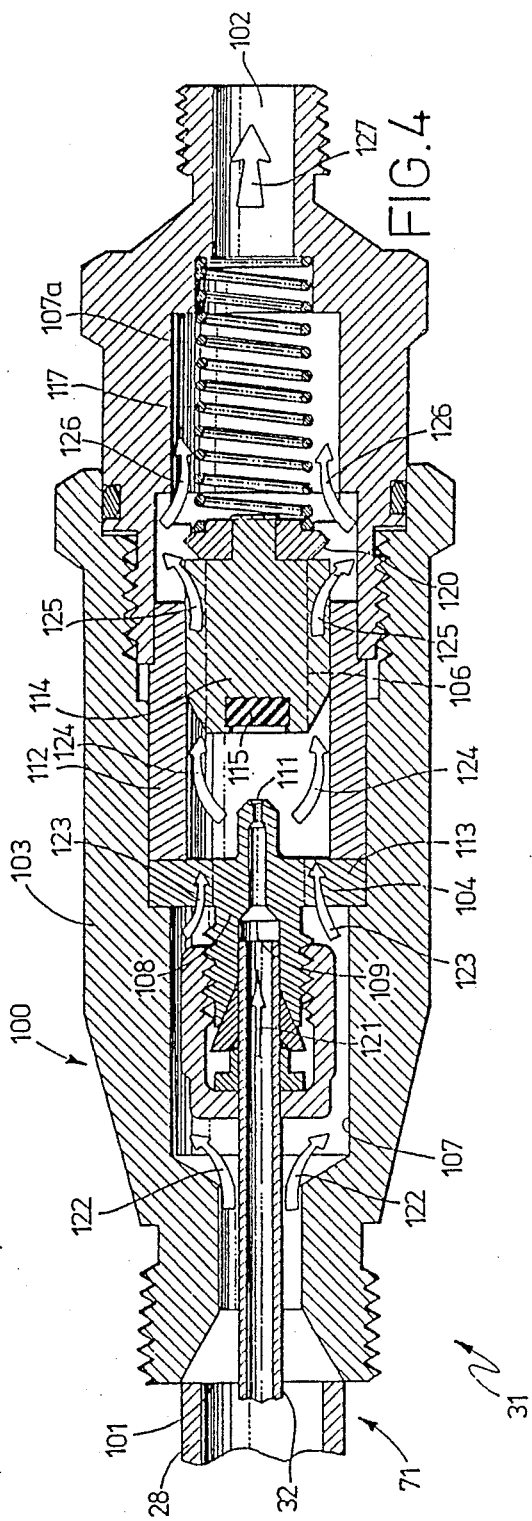
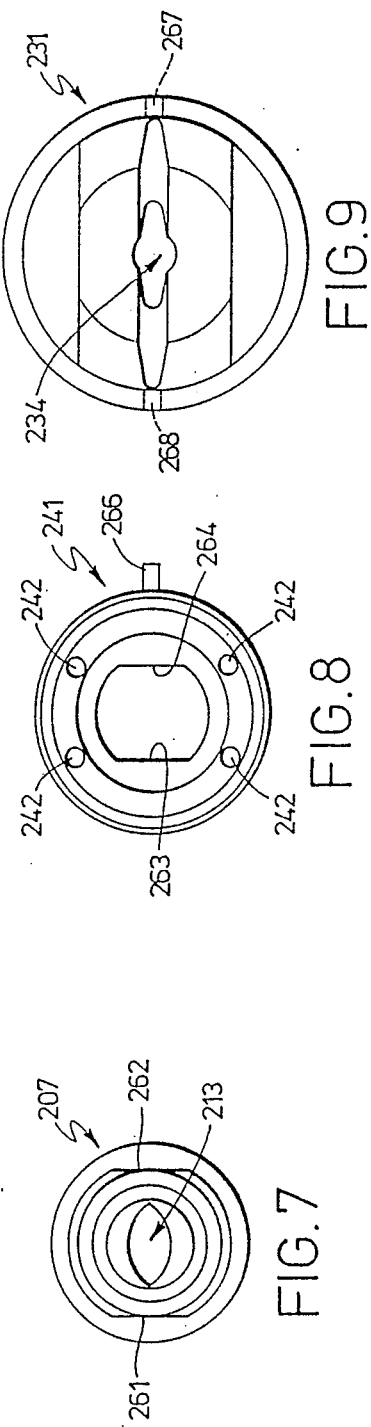
FIG. 4
FIG. 7
FIG. 8
FIG. 9

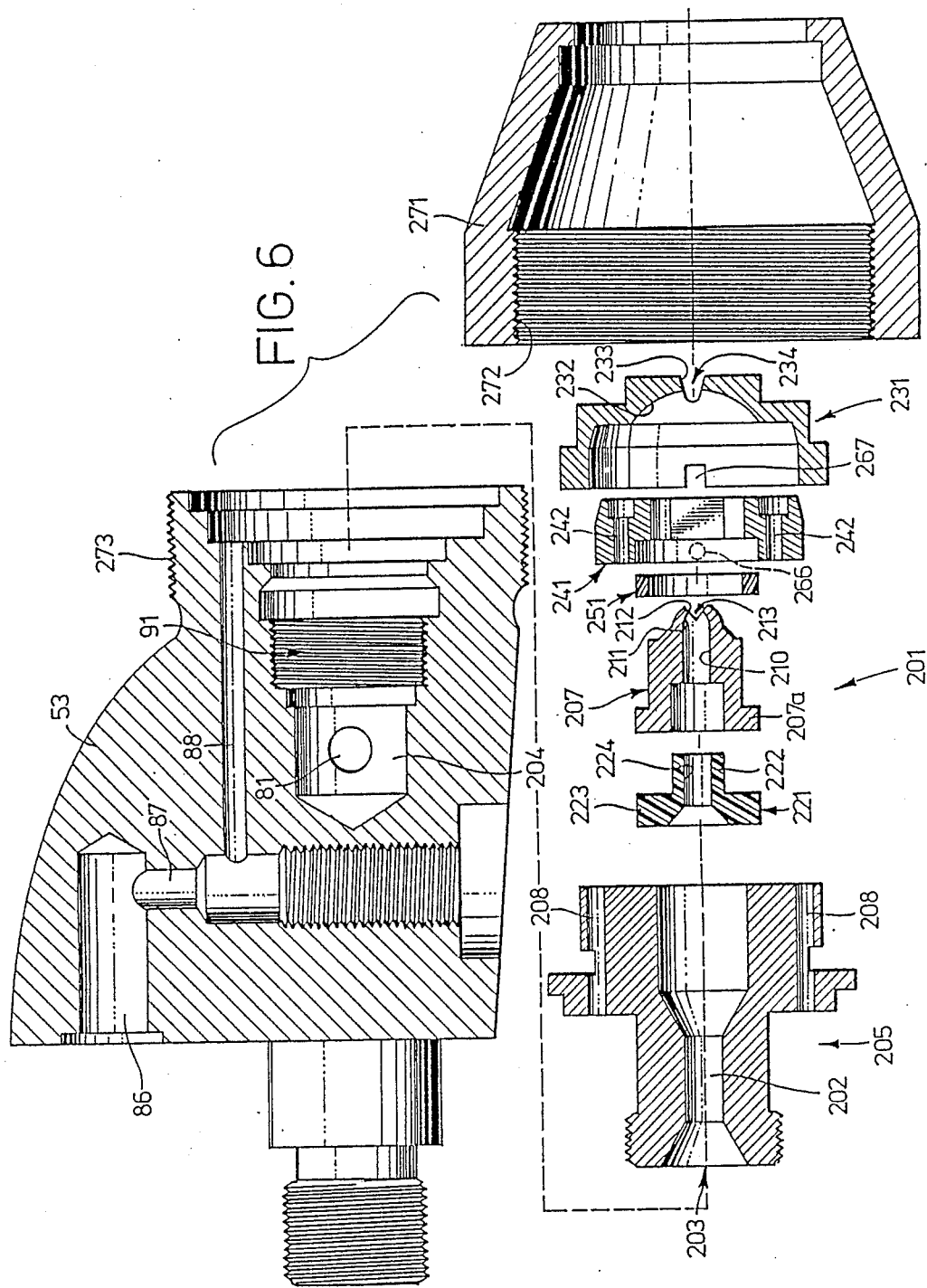

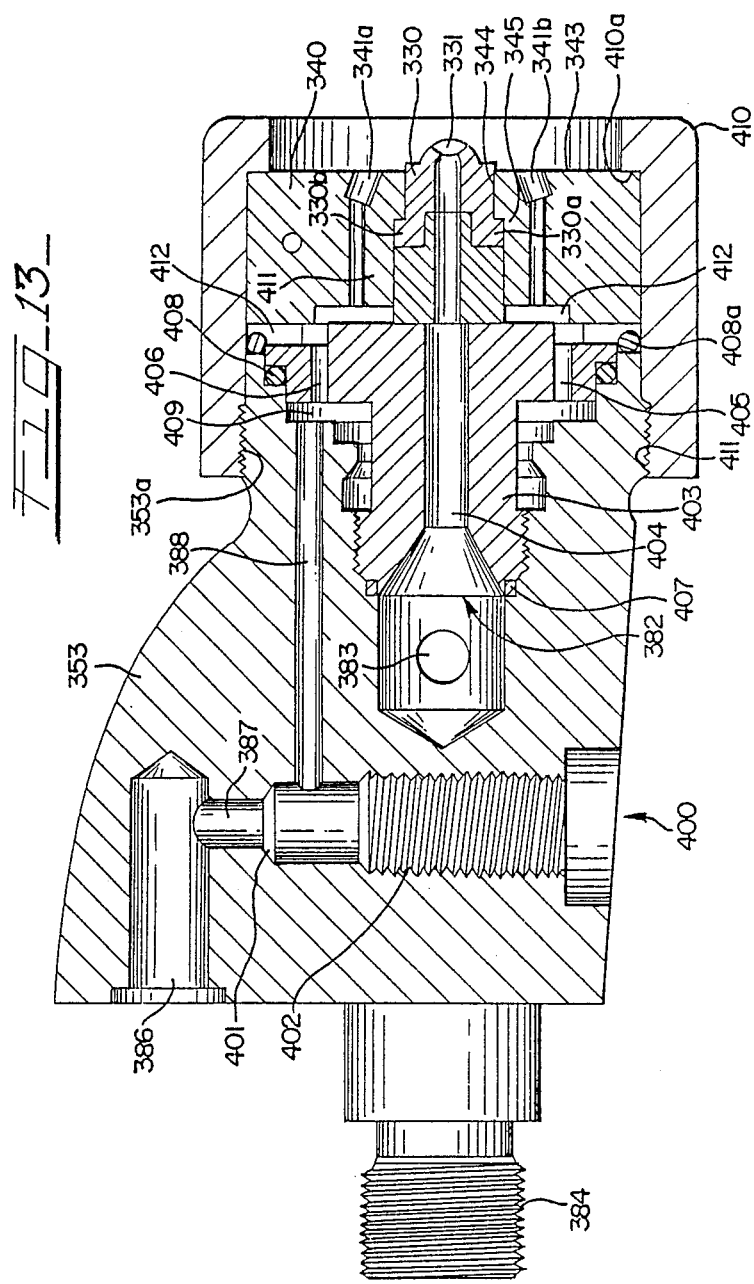

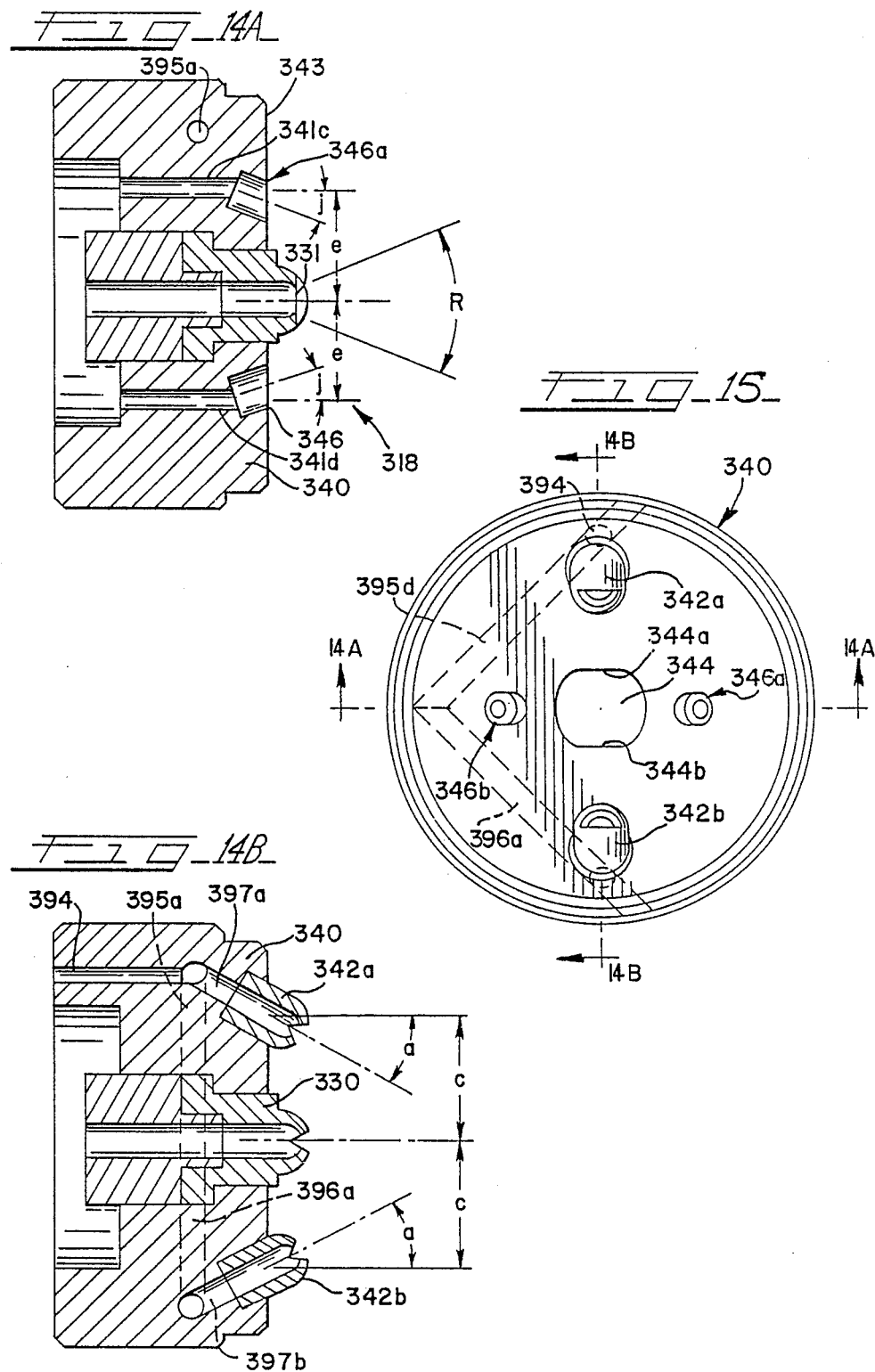

MULTI-COMPONENT SPRAYING SYSTEM

This is a continuation in part of U.S. patent application Ser. No. 07/080,475 filed July 31, 1987, now U.S. Pat. No. 4,824,017 which was a continuation in part of U.S. patent application Ser. No. 885,006 filed July 14, 1986, now abandoned.

BACKGROUND OF THE INVENTION

The present invention relates generally to multi-component spraying systems and, more particularly, to air-assisted, airless-atomization, plural component spraying systems and methods.

Multi-component spraying systems are used in manufacturing plastic articles by applying resinous materials to a mold or preform for an article. In such systems, a liquid resin and a catalyst for the resin are formed into spray particles directed to a substrate where the catalyst and resin react and harden to form the article. In such applications, the resin and catalyst components are preferably mixed together; and the mixture is sprayed onto the substrate. For example, in manufacturing articles with polyester resin, a catalyzing agent for the polyester resin is mixed with the resin; and the resin-catalyst mixture is applied to the substrate. In internal mix systems, the resin and catalyst are mixed within the spraying apparatus; and the mixture is atomized by a spray nozzle and directed onto the substrate. In external mix systems, the resin and catalyst are mixed externally of the apparatus after the resin and catalyst have been atomized. In both external mix and internal mix systems, complete and thorough mixing of the resin and catalyst is important to avoid non-uniform hardening of the resin on the substrate and other undesirable results.

In many spraying systems, large quantities of pressurized air are used to atomize the liquid components. Such systems are expensive to operate and have a number of operational inadequacies. It is expensive to compress air, and the large quantities of compressed air used by existing systems impose a significant operating cost on the system. In addition, the blast of compressed air used to atomize the liquid components carries a significant quantity of spray particles away from the substrate, wastes the expensive resin and catalyst, creates an unclean spray area and sometimes requires overspray collection systems, and contributes to the problem of operating such manufacturing operations safely. Furthermore, the use of large quantities of air during operation of the system can often create an undesirable spread of fumes.

In order to overcome some of the inadequacies attending the use of pressurized air to atomize components dispensed from a spraying apparatus, spraying systems have been developed which incorporate airless atomization techniques.

In prior airless atomization devices, an airless spray nozzle has been used to atomize liquid materials which are pumped at high pressure, that is, pressures generally exceeding 500–600 p.s.i. and more frequently in excess of 800 p.s.i., typical operating pressure being 1000–1500 p.s.i. The most commonly used airless nozzle includes an internal, hemispherical passage termination which is cut through by an external, V-shaped groove to form an elongated, elliptical-like orifice. Liquid material pumped at high pressures through such a spray nozzle is forced by the hemispherical termination of the passageway to converge in its flow at and through the elongated orifice. Because of the converging flow at the orifice, the liquid material is expelled through the orifice into a planar, expanding, fan-like film which breaks into spray particles which are carried by their momentum to the article target.

With viscous fluids, such as the resins used in plural component spraying systems to manufacture plastic articles, high pressures of 1000 to 1500 p.s.i. are required. Such high operating pressures impose a strain on system components reducing their reliability, require generally expensive components in the fluid delivery systems, and contribute to the problem of operating such systems safely. Even at high pressures, however, such fan-like films, because they are formed by the convergence of the fluid, include heavy streams at the edges of the planar, fan-like film which are referred to as "tails". Because of the heavy stream-like flow in the "tails", the spray pattern formed by these edge portions of the expanding, fan-like film includes a disproportionate quantity of resin and produces a non-uniform deposit with stripes when the spray pattern is swept across a substrate by a spray gun operator. The non-uniform deposit and resulting stripes make the bending of deposited material into a film of uniform thickness virtually impossible.

Past efforts to solve the problem of the "tails" attending the use of airless spray nozzles have included the insertion of a "preorifice" immediately behind the elongated, elliptical-shaped orifice to concentrate a greater portion of the flow in the central portion of the fan. Although preorifices are helpful, they are not completely satisfactory, adding another source of clogging to the spray gun and another variable factor to be integrated into system operation.

Compressed air has also been used to solve the problem of tails created by airless spray nozzles. See, for example, U.S. Pat. Nos. 3,202,363; 3,521,824; 3,635,400; 3,843,052; and 4,386,739 and Japanese patent publication No. 57-90762. In plural component spraying systems, compressed air has been used to assist in the atomization of plural component materials as shown, for example, in U.S. Pat. Nos. 2,780,496; 2,864,653; 3,799,403; and 4,618,098 and British patent specification No. 735,983.

External mix plural component systems originally included a plurality of separated spray gun or spray nozzles that were directed to blend their patterns together and to mix thereby resins and their catalysts or hardening agents. See, for example, U.S. Pat. Nos. 3,033,472; 3,399,834; 3,542,296; and 3,788,555. More recently, external mix plural component systems have included the plural spray nozzles in a combined nozzle assembly. See, for example, U.S. Pat. Nos. Des. 252,097; 3,893,621; 4,123,007; and 4,618,098.

In prior art external mix, plural component spraying systems using airless resin nozzles, catalyst has been injected into the resin spray formed from an airless spray nozzle at distances on the order of one inch or more in front of the airless spray nozzle. This downstream location for insertion of the resin spray provided mixing of the catalyst spray particles with resin spray particles which had already been formed from the liquid resin at this location. In such prior plural component systems, resin spray particles are formed within a fraction of an inch of the airless spray nozzle, either under the influence of high hydraulic resin pressures, typically on the order of 1,000 psi, or the combined action of lower hydraulic resin pressures and a plurality of compressed air jets located adjacent the airless resin nozzle and directed at the expanding fan-like resin film directly adjacent the liquid orifice of the resin nozzle. Introduction of the catalyst to the spray an inch or more downstream of the liquid orifice was also necessary to avoid the collection of catalyst on the resin nozzle. In prior external mix spraying systems, catalyst spray particles introduced closely adjacent the spray nozzle frequently accumulated on the resin nozzle. An accumulation of catalyst on the resin nozzle will combine with resin at the resin nozzle orifice and cure the resin, blocking the resin nozzle orifice and, requiring removal of the resin nozzle for cleaning or replacement.

In such prior external mix systems, a substantial flow of air accompanied the rapidly moving resin particles at the downstream location of catalyst injection; and this substantial flow of air was transverse to the direction of the catalyst spray being injected into the spray pattern and made it difficult to inject catalyst particles uniformly into the resin spray. In such prior external mix systems, the catalyst particles were injected into a flow of compressed air by the associated apparatus to blow them into and mix them with the resin spray particles. The flows of air accompanying the formation of the resin particles and used to blow the catalyst particles into the resin spray produced uncontrolled billowing air movements which prevented the fine catalyst particles from being incorporated into the spray pattern and being mixed with the resin particles and deposited on the substrate. More importantly, the air flows associated with such prior external mix systems led to the escape of fine catalyst particles into the surrounding environment, thus presenting cleaning problems and requiring air removal systems.

Furthermore, in such prior external mix systems, it was difficult to obtain desirable spray patterns. The use of the plurality of compressed air jets to assist in atomization of the expanding resin film directly adjacent the liquid orifice of the airless nozzle, where the film had substantial integrity, resulted in a deflection of a portion of this compressed air and contributed to the uncontrolled billowing. This was especially true in systems in which the compressed air jets were directed against airless nozzle itself. The focus of the compressed air jets to assist the atomization of the resin film at the airless resin nozzle made it difficult to effectively use the compressed air from the jets to form resin and catalyst particles into a desirable spray pattern. Furthermore, because of the direction and force required of the compressed air to carry the catalyst particles into the resin spray and to achieve effective mixing of the catalyst particles with resin particles, the compressed air used to entrain the catalyst particles could not be effectively used to provide a satisfactory spray pattern.

SUMMARY OF THE INVENTION

The inventions rests on the discovery of method and apparatus that includes a flow of compressed air and entrained catalyst particles directed at the expanding, fan-like, resin film closely adjacent the airless nozzle, that effectively mixes catalyst particles with resin particles formed from an airless resin nozzle, and that provides a small, compact spray pattern with uniformly distributed and mixed resin and catalyst that may be easily used by an operator to deposit a uniform film of plural component material on a substrate. In this invention, finely atomized spray particles are not a specific desideratum, not being necessarily required in the manufacture of articles from plural component spraying systems. To the contrary, such articles are generally provided with smooth surfaces by the substrates, molds, or preforms upon which the plural component materials are deposited and cured; and it is desirable that the spray particles remain large enough so that their surface areas are small compared to their masses and they retain their fluidity so they may flow out on a substrate, mold, or preform upon deposition. This retention of fluidity also enhances the ability of the catalyst spray particles to mix with and cure the resin particles upon deposition. The invention provides an external mix, plural component spraying system which is less expensive to manufacture, operate, and maintain and which provides a more effective spray operation, permitting a reduction of liquid pressure and a more effective use of compressed air.

In one embodiment of the invention, a low-volume flow of compressed air and entrained catalyst particles are imposed upon resin projected from an air-less nozzle at lower than normal fluid pressures to effectively atomize the resin and, particularly, the resin tails, into small, uniformly sized particles and to effectively and uniformly mix the catalyst with the resin externally of the system apparatus.

Apparatus of the invention includes a first source of resin, a second source of catalyst for the resin, spraying means to mix the catalyst with the resin and to direct mixed catalyst and resin at an article forming substrate, liquid delivery means to provide a flow of resin from the first source to the spraying means, air delivery means to provide a flow of compressed air to the spraying means and injection means to introduce catalyst particles in the air delivery means. The spraying means comprises a liquid nozzle for forming the resin into a fan-like resin film with expanding edges extending from a liquid orifice, and a nozzle assembly directing a flow of compressed air and catalyst particles at the fan-like resin film. The liquid nozzle and nozzle assembly are adapted so that the flow of compressed air and catalyst particles interact with the fan-like resin film and its expanding edges to provide a spray pattern with mixed and uniformly distributed catalyst and resin particles.

In one preferred embodiment, the airless liquid nozzle is of generally conventional design in that it includes an internal passageway terminating at an internal hemispherical surface which is cut through by an external, V-shaped groove to form an elongated, elliptical-shaped, liquid orifice. The nozzle assembly is positioned around and adjacent to the liquid nozzle and comprises an annular chamber terminated at its forward end by an internal, generally hemispherical-shaped surface which is also cut through by an external, V-shaped groove to form an elongated, elliptical-shaped, air-catalyst orifice. The design and location of the air-catalyst orifice forms a flow of compressed air and catalyst particles which is generally juxtaposed around the fan-like film of resin at the liquid orifice and which includes a greater mass flow of compressed air and catalyst at the edges of the fan-like film at which the "tails" exist. The flow compressed air and catalyst will, therefore, provide preferential assistance in the atomization of the resin "tails" and the mixing of catalyst and resin to provide a spray in which the resin particles are of more uniform size and in which the catalyst carried by the compressed air flow will be more uniformly mixed with the resin particles throughout the volume of the spray.

In another embodiment of the invention, a flow of compressed air is directed at the planar surfaces of the expanding film of mixed resin and catalyst from the opposite sides thereof to impinge upon the expanding resin-catalyst film a fraction of an inch forwardly of the liquid orifice and a pair of compressed air flows is directed forwardly and generally parallel to each other and to the spray axis to impinge upon the expanding sides of the resin-catalyst film forwardly of the impingement of the compressed air on the expanding liquid film. Surprisingly, when compressed air is directed at the expanding edges of the fan-shaped resin-catalyst film downstream of the impingement of the compressed air upon the expanding liquid film, the uncontrolled billowing flow of air and escaping particles are eliminated. In addition, spray pattern size is reduced; and an improvement in spray pattern uniformity results without the creation of escaping atomized resin-catalyst particles characterized by prior air-assist, airless resin atomizing systems. The coaction of the flows of compressed air results in the capture of the resin-catalyst particles within the spray pattern.

The invention further permits more complete and effective atomization of the mixed resin and catalyst at liquid pressures and air volumes substantially lower than those commonly used in the prior art. Systems incorporated into the present invention, for example, may effectively operate with liquid pressures as low as 300–500 p.s.i.

Further advantages and specific details of the invention will be set forth hereafter in conjunction with the detailed description of the preferred embodiment.

BRIEF DESCRIPTION OF THE DRAWINGS

FIG. 2 is a partial cross-sectional view of a spray gun body and catalyst injection means of FIG. 1;

FIG. 3 is a top view of the spray gun body of FIG. 2 partially in section;

FIG. 4 is a cross-sectional view of the catalyst injection means of FIGS. 1 and 2;

FIG. 6 is an exploded view of the nozzle assembly of FIG. 5;

FIG. 7 is a front end view of the liquid nozzle spray tip of FIGS. 5 and 6;

FIG. 8 is a front end view of the spray tip holder of FIGS. 5 and 6;

FIG. 9 is a front end view of the air-catalyst nozzle of FIGS. 5 and 6;

FIG. 13 is a cross-sectional view of the head portion of the embodiment of FIGS. 10-12 taken at a vertical plane through its center;

FIGS. 14A and 14B are two orthogonal views of the nozzle assembly of FIGS. 10 and 13; and FIGS. 15 is a front view of the nozzle assembly of FIGS. 14A and 14B.

DETAILED DESCRIPTION OF THE PREFERRED EMBODIMENT

Figure 1:
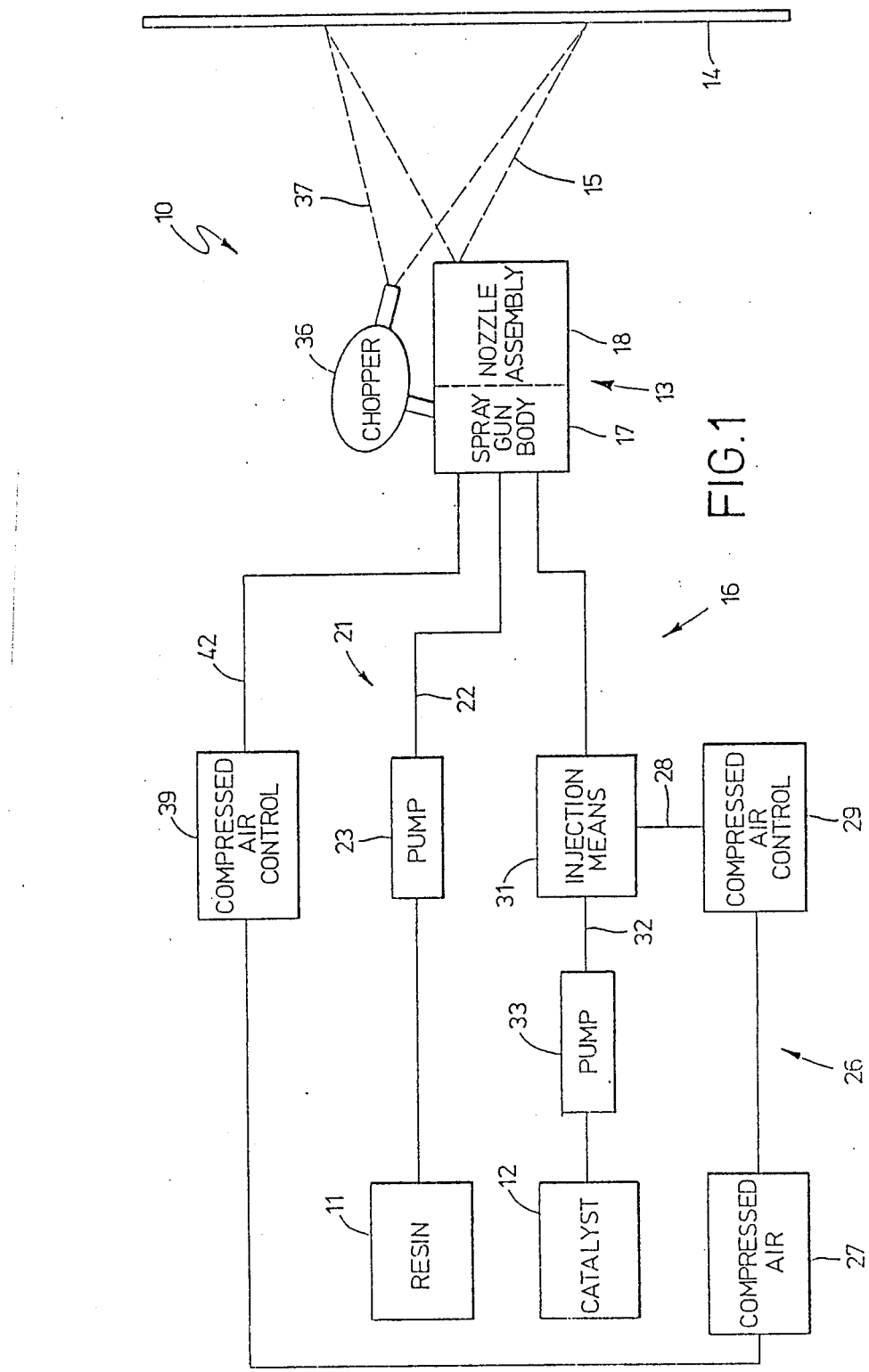
FIG. 1 schematically illustrates an external mix, air-assisted, plural component spraying system of the invention.

FIG. 1 schematically illustrates an external mix, air-assisted, airless atomization, plural component spraying system of the invention. The system is generally designated by reference numeral 10 and includes a first source 11 of a first component, e.g., a resinous material; a second source 12 of a second component, e.g., a catalyst for the resinous material; spraying means 13 for mixing the catalyst and resin and for directing the mixture at a substrate 14; and delivery means 16 for delivering the resin, catalyst, and other materials to the spraying means during operation of the system.

Spraying means 13 preferably comprises a handheld spray gun which includes a spray gun body 17 with a nozzle assembly 18 at its front. Nozzle assembly 18, which is described in detail below, comprises an airassisted, airless atomization nozzle assembly in which compressed air and liquid pressure are combined in the spraying of the resinous material. Thus, system 10 includes a compressed air source 27; and delivery means 16 includes air delivery means 26 for delivering compressed air to the spraying means 13. In addition, a flow of resin from source 11 is delivered under pressure to spraying means 13 via liquid delivery means 21, which includes conduit 22 and pump 23.

Catalyst from source 12 is delivered to spraying means 13 by introduction into the compressed air from source 27 that assists in atomization of the resin. Specifically, system 10 includes catalyst injection means 31, which receives catalyst under pressure from source 12 via conduit 32 and pump 33, and compressed air from source 27 via compressed air control 29 and conduit 28. Catalyst injection means 31 introduces the catalyst into the compressed air as a spray for delivery to the spraying means 13.

As described below, the flow of resin into spraying means 13 is directed through an airless liquid nozzle in nozzle assembly 18 which forms the resin flow into a fan-like film. The flow of catalyst-injected compressed air into spraying means 13 is directed through an air nozzle in nozzle assembly 18 configured and positioned so that the compressed air will coact with the fan-like resin film externally of the spraying means, assist in atomization of the resin and, particularly, the tails of the fan-like film, and simultaneously mix the resin and catalyst particles.

The resin-catalyst mixture from spraying means 13 is directed at substrate 14 as an expanding fan-like spray schematically illustrated at 15. Substrate 14 comprises an article-forming substrate such as a mold or preform used to manufacture articles from the catalyzed resin applied thereto. The resin can comprise any one of numerous materials such as a polyester or epoxy resin, and the catalyst comprises a material suitable for catalyzing the resin.

System 10 may include a chopper 36 mounted to spraying means 13 to dispense strands of fiberglass or the like into the spray pattern 15, as indicated at 37, to reinforce the plastic article and to act as a filler. System 10 includes a second compressed air control 39 connected to spraying means 13 by conduit 42. Compressed air from source 27 through control 39 drives an air motor in chopper 36 and can be used to remove any resin residue from the spraying means following a spraying operation.

FIG. 2 illustrates spraying means 13 and catalyst injection means 31 in greater detail. As shown, spraying means 13 comprises a hand-held spray gun including a spray gun body 17 having a nozzle assembly 18 affixed to the front end thereof. As shown in FIG. 2, gun body 17 includes a body portion 51, a handle portion 52, and a head portion 53. A trigger 54 is movably attached to body portion 51 by an axle or pin 56.

The rear face of body portion 51 of spray gun body 17 defines a mounting platform 57 having a plurality of openings 61, 62, and 63 therein (see FIG. 3). Openings 61–63 comprise inputs to a plurality of passageways within the spray gun body through which the catalyst, resin, and compressed air are caused to flow during operation of the spray gun. As shown in FIG. 2, catalyst injection means 31 is adapted to be connected to opening 63 so that compressed air from source 27 (FIG. 1) will be combined with catalyst from source 12 and introduced into and caused to flow through spray gun body 17. Opening 61 is adapted to be connected to resin source 11 via conduit 22, and opening 62 is connected to compressed air source 39 via line 42 to power the motor in chopper 36. The various conduits are connected to the gun body by appropriate hose couplings such as illustrated at 67 and 68 in FIG. 2. As shown in FIG. 2, platform 57 is preferably angled at about 30°–60° from the horizontal to conveniently connect the gun to hoses or other conduits carried by overhead booms or over an operator's shoulder.

Catalyst injection means 31 can comprise the fluid valve and mixing assembly described and shown in U.S. Pat. No. 3,763,876 of Freeman et al., the disclosure of which is incorporated herein by reference. As described in the Freeman et al. patent, the mixing device 31 is connected to compressed air source 27 and catalyst source 12 by a hose 71 having inner and outer concentric conduits 32 and 28, respectively. Spring 72 is positioned around hose 71 to provide for controlled flexing of the hose and to protect the outer conduit 28. While FIGS. 2 and 4 show the catalyst injection means 31 as a separate unit, the operative portions of the catalyst-injection means may be housed within the gun body.

As shown in FIGS. 2 and 3, compressed air and catalyst flowing into spray gun body 17 through opening 63 from catalyst injection means 31 flow through passageway 76, a valve assembly 83, and passageways 78 and 79 in gun body portion 51 and through passageways 86, 87, and 88 in the head portion 53 (see FIGS. 5 and 6) and into the nozzle assembly 18. Resin flows into the spray gun body through opening 61 and flows through similar passageways and a valve assembly including passageway 80 in gun body 17 and through passageway 81 in head portion 53 (see FIGS. 5 and 6) into nozzle assembly 18. Operation of valve assembly 83 and the valve assembly in the resin line and, hence, control of the flow of resin and catalyst-injected compressed air through the spray gun, is achieved by depressing and releasing the trigger 54.

To provide the capability of operating a chopper, the body portion 51 is provided with a passageway leading from opening 62 to a valve cavity, such as that in which valve assembly 83 is located, in the central plane of body portion 51 adjacent the trigger 54 and from the valve cavity to opening 64 (FIG. 3). Where a chopper is used, compressed air from source 27 is connected with opening 62; and its flow is controlled by a third valve assembly (not shown) which is installed in the control valve cavity and operated by squeezing trigger 54. The compressed air to drive the pneumatic chopper motor of chopper 36 is thus controlled by trigger 54 and directed to opening 64 which is connected to the chopper drive motor by a flexible conduit 65 as indicated in FIG. 2.

FIG. 4 illustrates the catalyst injection means 31 in greater detail. As indicated previously, catalyst injection means 31 may be identical to the fluid valve and mixing assembly described in U.S. Pat. No. 3,763,876 or may be incorporated into the gun body and is only briefly described herein. Catalyst injection means 31 comprises a fluid valve and mixing assembly 100 having an input end 101 connected to hose assembly 71, and an output end 102 adapted to be connected to opening 63 in spray gun body 17 (FIG. 2). Inner conduit 32 of hose assembly 71 connects the valve and mixing assembly 100 with catalyst source 12, and outer conduit 28 is connected with compressed air source 27.

Fluid valve and mixing assembly 100 comprises a housing 103 having an internal, cylindrical chamber 107 extending from input end 101 to output end 102. A fluid nozzle 108 is supported within chamber 107 and includes an internal passageway 109, the input of which is coupled to inner catalyst conduit 32. Passageway 109 tapers down to a fluid outlet orifice 111 from which catalyst is ejected during operation of the assembly 100. Nozzle 108 includes a web portion 113 having a plurality of webs extending outwardly therefrom and defining a plurality of peripheral openings 104 therethrough. A cylindrical sleeve 112 retains the web portion 113 and the nozzle body in position within housing 103.

A piston 114 is positioned within sleeve 112 and is movable lengthwise therein. The periphery of piston 114 is configured to define passageways 106 between the inner surface of sleeve 112 and the outer surface of piston 114. The end face of piston 114 retains a sealing member 115 which is adapted to close orifice 111 of the nozzle member 108. Piston 114 is normally biased towards the nozzle by spring 117 such that the sealing member 115 will normally abut against and seal orifice 111 when no fluids are flowing through the valve and mixing assembly 100. When piston 114 is biased to the left in FIG. 4, with sealing means 115 closing orifice 111, passageways 106 in piston 114 are closed by circular end portion 120 of piston 114 which forms a seal with the inner surface of sleeve 112.

In operation, catalyst is supplied under pressure to the inner conduit 32; and pressurized air is supplied to outer conduit 28. Catalyst enters into the inner passageway 109 of nozzle 108, as indicated by arrow 121, but is prevented from exiting through the orifice 111 as a result of piston 114 being biased against orifice 111 by spring 117. Pressurized air from conduit 28 is contained within chamber 107, around the body of fluid nozzle 108, in the passageways 104 in webbed portion 113, and in passageways 106 between the piston 114 and sleeve 112; and its pressure acts upon circular end portion 120 of piston 114.

The compressed air acting upon the end portion 120 of piston 114 will not, however, move piston 114 as long as the valve assembly 83 in gun body 51 is closed. When trigger 54 is pulled, however, opening the valve assembly 83, chamber 107a is opened to atmospheric pressure. The pressurized air, acting on the circular end portion 120 of piston 114, causes the piston to move to the right, as shown in FIG. 4, in the direction of fluid flow.

When piston 114 moves to the right, to the position shown in FIG. 4, orifice 111 is uncovered, allowing catalyst to exit through the orifice into the interior of annular sleeve 112. In the position shown in FIG. 4, passageways 106 in the piston are unblocked, allowing the compressed air to flow therethrough into chamber portion 107a, as indicated by arrows 122, 123, 124, and 126, and as indicated by arrow 127, through output 102 into gun body 51 and through its passageways to nozzle assembly 18. The catalyst will also flow outwardly around piston 114 and thoroughly mix with the pressurized air prior to the mixture flowing into the spray gun body.

When the trigger 54 is released, the flow of pressurized air is terminated; the energy stored in spring 117 will be released; and the piston 114 will be driven to the left to again block orifice 111 to terminate flow of catalyst through the orifice. Thus, fluid valve and mixing assembly 100 provides a convenient, reliable, and effective means for injecting catalyst into the compressed air used to assist in atomization of the resin flowing through spraying means 13.

FIGS. 5-9 illustrate the air-assisted, airless nozzle assembly 18 incorporated into spraying means 13 of the system of the invention. Nozzle assembly 18 is shown in assembled form in FIG. 5 affixed to the head portion 53 of spray gun body 17, and in exploded form in FIG. 6. Basically, nozzle assembly 18 comprises a liquid nozzle 201 for forming a resin flow into a fan-like film with expanding edges extending from a liquid orifice, and an air nozzle 231 for forming a flow of catalyst injected compressed air into a fan-like flow extending from an air orifice. The air nozzle 231 and the liquid nozzle 201 are positioned and oriented relative to one another so that the expansion and fan-like flow of catalyst-injected compressed air will interact with the fan-like resin film and its expanding edges to assist in atomization of the resin film and to uniformly mix the catalyst and the resin particles.

Figure 5:
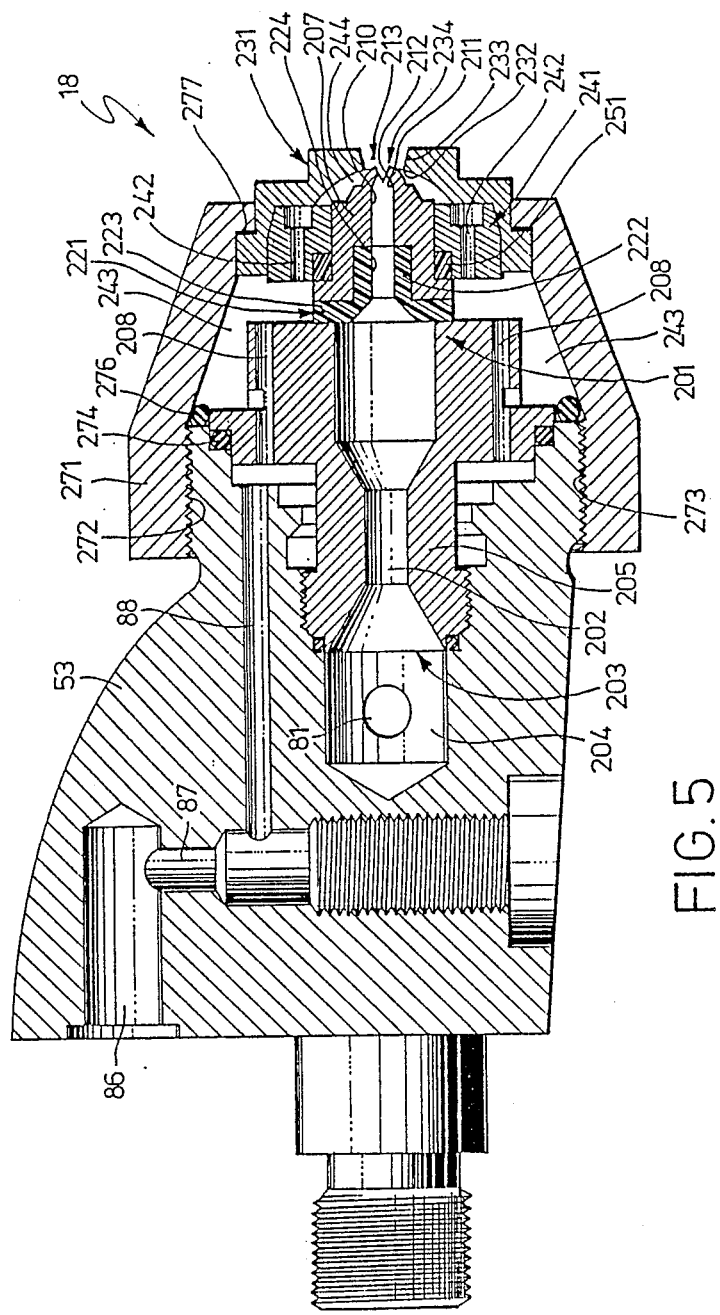
FIG. 5 is a cross-sectional view illustrating the nozzle assembly of FIG. 2 that is affixed to the head of the spray gun body.

With reference to FIGS. 5 and 6, liquid nozzle 201 comprises a body portion 205 and a separate liquid spray tip portion 207. Body portion 205 comprises a generally cylindrical-shaped member of aluminum or the like having a central passageway 202 extending longitudinally therethrough. When nozzle assembly 18 is mounted to spray gun body 17 in the cavity 91 provided therein, passageway 202 communicates with passageway 81 in head portion 53 in the spray gun body (see FIG. 3) via chamber 204 to receive a flow of liquid resin through input end 203 thereof. Body portion 205 of nozzle 201 also includes a plurality of relatively narrow, longitudinal passageways 208 (e.g., four passageways) around the periphery thereof. Passageways 208 are adapted to receive a flow of catalyst-injected compressed air from passageways 86, 87, and 88 in head portion 53 of gun body 17, as will be described more fully hereinafter.

Spray tip 207, also shown in FIG. 7, is mounted on the end of body portion 205 and includes an internal, central passageway 210 aligned with passageway 202 in body portion 205. Passageway 210 terminates at an internal, generally hemispherical surface 211 which is cut through by an external, V-shaped groove 212 to define an elongated, elliptical-like, liquid orifice 213. Spray tip 207 may be constructed of tungsten carbide or another suitable material.

As is known in the spraying art, liquid nozzle 201 comprises an airless spray nozzle for atomizing the liquid resin. Liquid resin flowing through spray tip 207 is forced by the hemispherical termination of the passageway 210 to converge in its flow at and through the elongated orifice 213. Because of the converging flow at the orifice 213, the liquid material is expelled through the orifice into an expanding fan-like film which breaks into spray particles which are carried by their momentum to the substrate 14 (FIG. 1) or other target.

Nozzle assembly 18 further includes a nozzle seal 221 positioned between body portion 205 and spray tip 207 to prevent leakage therebetween. Nozzle seal 221 comprises an annular sealing member having a portion 222 which extends into the internal passageway 210 of spray tip 207, and an annular shoulder portion 223 that is positioned between the body and the spray tip to seal therebetween. Nozzle seal 221 has an internal passageway 224 that is aligned with the passageway 210 in the spray tip when the seal is inserted into the spray tip. Nozzle seal 221 is sized to fit rather snugly within spray tip 207 but is removable for replacement whenever necessary.

As described previously, the fan-like resin film formed by liquid spray tip 207 typically includes heavy streams at its expanding edges which are referred to as "tails"; and the resin in such "tails" frequently forms resin particles which are unacceptably large. Air nozzle 231 provides a flow of catalyst-injected compressed air which assists in atomization of the fan-like resin film into particles of a smaller, more uniform size, while simultaneously mixing catalyst with the resin externally of the apparatus. Air nozzle 231, which is also shown in FIG. 9, comprises a dome-shaped member having a generally hemispherical, internal surface 232 which is cut through by an external, V-shaped groove 233 to form an elongated, somewhat elliptical, air orifice 234. Air nozzle 231 is positioned with respect to liquid spray tip 207 so that air orifice 234 is aligned with liquid orifice 213.

Air nozzle 231 is supported in position relative to spray tip 207 by spray tip holder 241 (see also FIG. 8) which functions to both space the air nozzle from the liquid nozzle and to maintain the two nozzles properly aligned with respect to one another. A spacer ring 251 is positioned around the spray tip 207 and rests upon the annular shoulder portion 207a of spray tip 207. Spacer ring 251 cooperates with spray tip holder 241, as shown in FIG. 5, to help position the air nozzle longitudinally with respect to the liquid nozzle. Spray tip holder 241 includes a plurality of passageways 242 extending therethrough for the passage of catalyst-injected compressed air from annular chamber 243 into dome-shaped chamber 244 beneath dome-shaped surface 232.

Upon operation of the trigger 54 of the spray gun body 17, catalyst-injected compressed air flows through passageways in gun body 17, including passageways 86, 87, and 88 in head portion 53 of gun body 17, and flows through passageways 208 in body portion 205 into annular chamber 243; and resin flows through the passageways in the gun body 17, including passageways 81 and 204 in the head portion 53 of gun body 17, and through passageways 202 and 210 into airless spray tip 207. From annular chamber 243, the catalyst-injected, compressed air flows through passageways 242 in spray tip holder 241 into the chamber 244 beneath hemispherical surface 232 in the air nozzle. The flow of catalyst-injected compressed air is forced to converge at the elongated orifice 234 and, it is believed, expands outwardly in a fan-like flow with a concentrated mass flow at its edges. The expanding flow of compressed air is juxtaposed around the fan-shaped liquid film formed by the liquid nozzle and provides a greater mass flow of compressed air juxtaposed to the expanding edges of the fan-like resin film to provide a concentration of the atomizing effect of the compressed air in the area of the "tails" formed by the liquid nozzle, thus providing preferential assistance to atomize the "tails" of the film to reduce the size of resin particles in the area of the tails and to provide a spray of substantially uniform sized particles.

The flow of the compressible air fluid is substantially like the flow of the incompressible resin fluid in the sense that both are urged to converge at elongated orifices which are generally coaxial and generally coplanar along their central axes. Because, however, the liquid nozzle and the compressed air nozzle share a common axis, the flow of air directed at and acted upon by the generally hemispherical surface at the inside of the air nozzle is generally annular in cross section prior to its interaction with the hemispherical internal surface of the air nozzle.

Because the catalyst is generally uniformly entrained in the flowing compressed air, a greater concentration of catalyst will be formed adjacent the tails of resin spray; and as the compressed air and the liquid film interact, the catalyst injected into the compressed air will be mixed with the resin in a substantially uniform manner.

The various components forming nozzle assembly 18 are assembled by concentrically nesting one part upon or within another. Specifically, to assemble nozzle assembly 18, body portion 205 is positioned in the opening 91 provided in the head portion 53 of spray gun body 17. Spray tip 207 having nozzle seal 221 inserted therein and spacer ring 251 positioned therearound is then placed on nozzle body 205. Spray tip holder 241 is then positioned over the spray tip 207.

As shown in FIG. 7, spray tip 207 includes a pair of opposed flat external surfaces 261 and 262 extending lengthwise thereon. As in FIG. 8, spray tip holder 241 includes a pair of opposed, flat, internal surfaces 263 and 264. To insert spray tip holder 241 over spray tip 207, surfaces 263 and 264 must be aligned with surfaces 261 and 262, respectively. Accordingly, surfaces 261-264 and 262, respectively. Accordingly, surfaces 261-264 function as first alignment means to automatically angularly orient the spray tip holder with respect to the spray tip.

As also shown in FIG. 8, spray tip holder 241 includes a small peg 266 extending outwardly therefrom. Peg 266 is adapted to be received within one of a pair of diametrically opposed slots 267 and 268 formed in the side of air nozzle 231 as shown in FIGS. 6, 8, and 9 when air nozzle 231 is inserted over spray tip holder 241. Thus, peg 266 and slots 267 and 268 function as second alignment means to automatically angularly orient the air nozzle with respect to the spray tip holder so that the long dimensions of their orifices run in the same direction.

The first and second alignment means thus ensure that the liquid orifice 213 in spray tip 207 will be in proper alignment with the air orifice 234 in air nozzle 231 for proper operation of the nozzle assembly whenever the nozzle components are assembled together.

Following mounting of the air nozzle, an external retaining ring 271 is positioned over the assembled components to hold the components together and to mount the nozzle assembly to the spray gun body. Retaining ring 271 preferably includes a threaded portion 272 to engage a threaded surface 273 on the head portion 53 of the spray gun body to firmly hold the nozzle assembly on the spray gun body while permitting easy removal therefrom for servicing or replacement. 0-ring seals are preferably provided at 274, 276, and 277 to prevent leakage between the retaining ring and other components of the apparatus.

The nozzle assembly of the present invention can be easily disassembled for servicing whenever necessary, and then quickly reassembled for use. The invention, in particular, permits rapid replacement of the liquid nozzle spray tip 207 without replacing the entire liquid nozzle. Ease in replacement of spray tip 207 is an important capability because liquid orifice 213 tends to clog because of its small size and frequently needs replacement. The separate spray tip 207 also permits the spray tip to be used with nozzle bodies of different configuration for different applications. The present invention thus reduces equipment downtime and the cost of replacement and inventory of parts.

In assembling the nozzle structure, the first and second alignment means provides proper, automatic alignment of the liquid and air orifices to ensure proper operation of the spray gun. The basic method of air-assisted, airless atomization of the invention permits less criticality in the location of air and liquid nozzles and thus greatly simplifies the assembly procedure.

FIGS. 10–15 illustrate a preferred embodiment of an internal mix, plural component spraying system of this invention.

FIGS. 10–13 illustrate the preferred embodiment of a hand-held, spraying means 313. The hand-held spraying means 313 preferably comprises a spray gun body 317 with a nozzle assembly 318 at its front. Spray gun body 317 and nozzle assembly 318 are described in substantially more detail below.

The embodiment of FIGS. 10–13 shows the nozzle assembly 318 adapted for use without a chopper, that is, its spray pattern is oriented vertically. Spraying means 313 may be fitted with a chopper 500, in the same manner as spraying means 13 of FIG. 2 is fitted with chopper 36, by attaching it to spray gun body 317 by means of a bolt fastener 311 at the top of spray gun body 317. When spray means 313 is used with a chopper, the nozzle assembly is oriented to provide a horizontal oriented spray pattern. When a chopper is used in conjunction with spraying means 313, a flexible air hose 501 connects opening 502 at the top of spray gun body 317 to the chopper. When a chopper is not used with spraying means 313, hole 502 is plugged with a threaded closure.

FIG. 10 schematically illustrates the internal mix, air-assisted, airless atomization, plural component spraying system of the invention. The system is generally designated by reference numeral 300 and includes a first source 311 of a first component, e.g., a resinous material; a second source 312 of a second component, e.g., a catalyst for the resinous material; spraying means 313 for mixing the catalyst and resin and for directing the mixture at a substrate 14; and delivery means 316 for delivering the resin, catalyst, and compressed air to the spraying means during operation of the system.

Spraying means 313 is shown in FIGS. 11–16 and preferably comprises a hand-held gun which includes a spray gun body 317 with a nozzle assembly 318 at its front. Spray gun body 317 incorporates a mixer **318*a* to mix the resin and catalyst within spray gun body 317. Nozzle assembly 318** comprises an air-assisted, airless atomization nozzle assembly in which compressed air and liquid pressure are combined in the spraying of the mixed resin and catalyst. Thus, system 300 includes a compressed air source 319. Delivery means 316 includes means 321 for delivering the resin including a resin pump 322 and resin conduit 323 between the source of resin 311 and the spray gun body 317; means 324 for delivering catalyst including a catalyst pump 325 and a catalyst conduit 326 between the source of catalyst 312 and the spray gun body 317; and means 327 for delivering compressed air including a compressed air control 328 and an air conduit 329 between compressed air source 319 and spray gun body 317.

As described below, a flow of resin from resin source 311 and a flow of catalyst from catalyst source 312 are delivered to spray gun body 317 where they are mixed by mixer 318a and directed as a mixture of catalyst and resin to nozzle assembly 318 which creates a spray of resin-catalyst particles for direction to a substrate 314. Nozzle assembly 318 includes an airless spray nozzle to which the mixed resin and catalyst are directed and which forms the mixed resin and catalyst into a fan-like film. Nozzle assembly 318 also includes a plurality of compressed air nozzles to coact with the airless spray nozzle to assist in atomization of the resin-catalyst mixture, particularly the tails of the fan-like resin-catalyst film formed thereby, and to capture the particles of resin and catalyst within the resulting spray pattern. Thus, mixed resin and catalyst can be applied to substrate 114 where it solidifies to form an article of manufacture. Substrate 14 can be a mold for an article, such as a heat hull, boat part, shower stall, or the like. Any one of a number of resins and catalysts can be used in systems of this invention.

System 300 may, of course, include a chopper 500 carried by spraying means 313 to dispense strands of fiberglass or the like into spray pattern 331 as shown at 332, to reinforce the article of manufacture formed on substrate 314.

Figure 11:
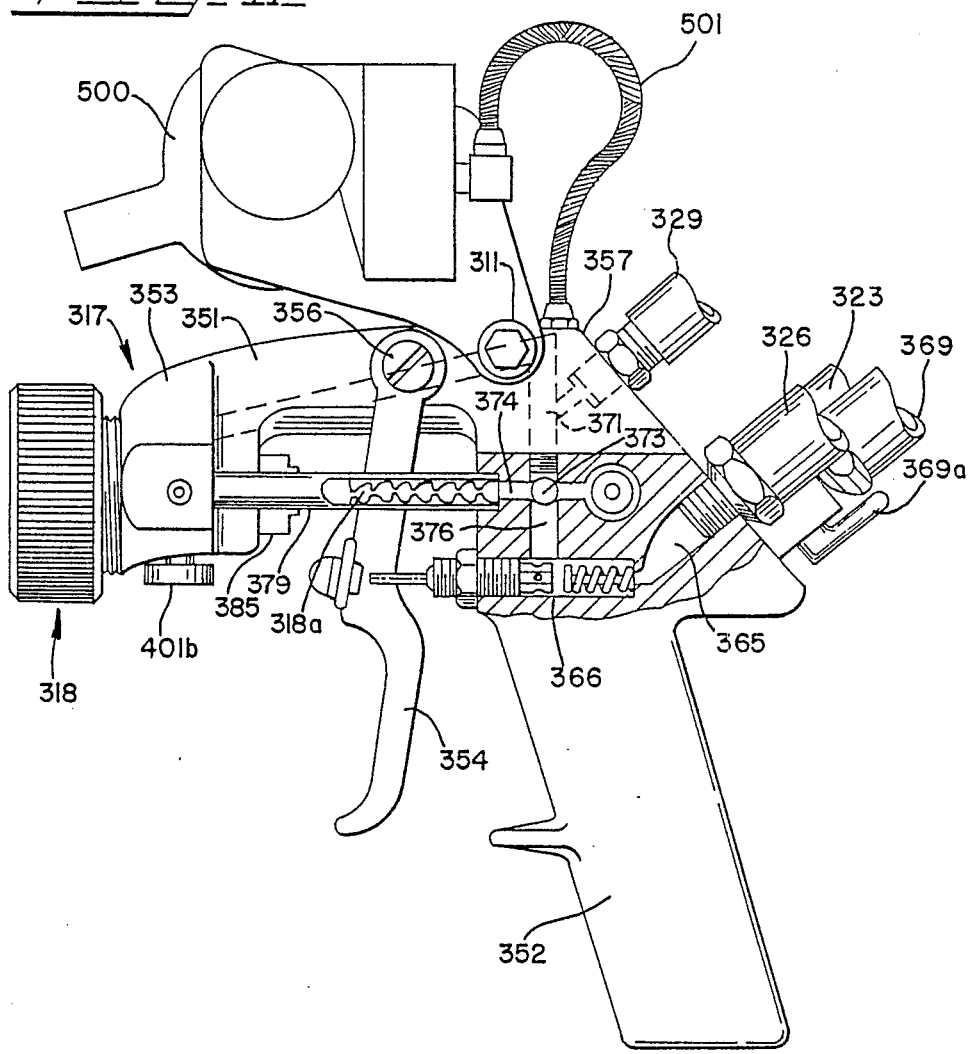
FIG. 11 is a side view, partially broken away, of the spraying means of the system of FIG. 10.
Figure 12:
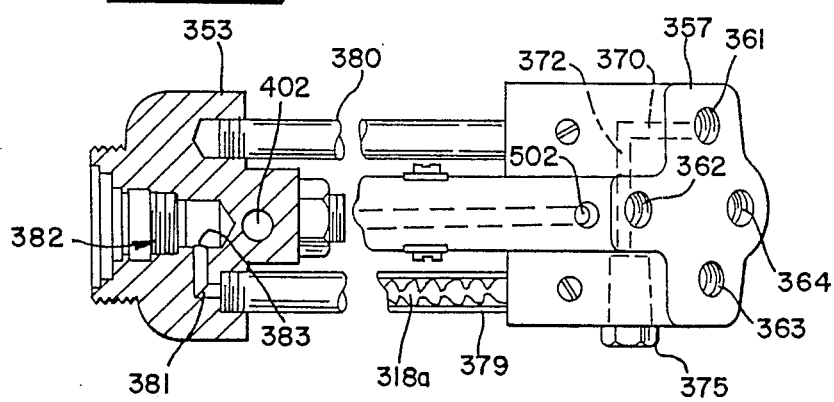
FIG. 12 is a top view of the spray gun body of FIG. 11 partially in section.

FIGS. 11-13 illustrate spraying means 313 including spray gun 317 and 318 in greater detail. As shown in FIG. 11, spray gun 317 includes a body portion 351, a handle portion 352, and a head portion 353. A trigger 354 is movably attached to body portion 351 by an axle or pin 356.

The rear face of body portion 351 of spray gun body 317 defines a mounting platform 357 having a plurality of openings 61, 62, and 63 formed therein (see FIG. 12). Openings 61–63 comprise inputs to a plurality of passageways within spray gun body 317 through which resin, catalyst, and compressed air flow in operation of the spray gun. Resin conduit 323 is connected to opening 361; catalyst conduit 326 is connected to opening 363; and air conduit 329 is connected to opening 362. A fourth opening 364 permits a cleansing solvent to be forced through spray gun 317 to cleanse it of mixed resin and catalyst and prevent mixed resin and catalyst from curing within spray gun 317 and preventing its operation. A solvent pump 367 delivers solvent from a solvent source 368 through a solvent conduit 369 connected to opening 364. As shown in FIG. 11, platform 357 is angled at about 30° –60° to conveniently connect spray gun 317 to conduits 323, 326, 329, and 369.

As shown in FIG. 11, catalyst is delivered through catalyst conduit 326 and opening 363 into passageway 365, a control valve assembly 366. Resin is delivered through resin conduit 323 and opening 361 into passageway 370 (shown in phantom in FIG. 12) to a valve assembly (not shown) which is like valve assembly 366 but is located on the opposite side of spray gun body 351 generally in line with opening 361. Compressed air is delivered through air conduit 329 and opening 362 into passageway 371 (shown in phantom in FIG. 11) to a fluid valve assembly (not shown) which is like valve assembly 366 but is located between the other two valve assemblies so that all three valve assemblies may be actuated by activation of trigger 354.

Upon activation of trigger 354, resin is permitted to flow from passageway 370 into passageway 372 (both of which are shown in phantom in FIG. 12) which opens at opening 373 into passageway 374, as shown in FIG. 11. Opening 373 is closed by a check valve 375 threaded into the spray gun body 351 until actuation of trigger 354 permits the hydraulic resin pressure from resin pump 322 to force resin into passageway 372 (FIG. 12) and through check valve 375 to passageway 374. Actuation of trigger 354 also permits catalyst to flow from passageway 365 into passageway 376 and passageway 374. Resin and catalyst flow through passageway 374 into tubular member 379 which contains mixer 318a where the resin and catalyst are mixed. Mixer 317 may be any commercially available static mixer of the type manufactured, for example, by TAH Industries, Inc., of Imlaystown, N.J. 03526 and sold as Stata-tube Part No. 5-3P. As shown in FIG. 12, the mixture of resin and catalyst flows from tubular member 379 into passageway 381 of head portion 353 of spray gun body 351. Passageway 381 opens into a bore 382 formed in head portion 353 at opening 383 (see FIGS. 12 and 13). As will be described below with respect to FIGS. 13-15, the resin-catalyst mixture will be forced from cavity 382 through the nozzle assembly 318.

Upon actuation of trigger 354, compressed air is permitted to flow from passageway 371 through passageways (not shown) formed in spray gun body 357 to the head portion 353. FIG. 13 illustrates in cross section head portion 353 of spray gun body 351 with nozzle assembly 318 attached. As those skilled in the art will recognize, head portion 353 will be held to spray gun body 351 by means of the threaded extension 384 and a nut 385 (FIG. 11). When so attached, passageway 386 of head portion 353 will be sealed in communication with the compressed air passageways of spray gun body 351. Compressed air will be delivered, upon actuation of trigger 354, into passageways 386 and 387. Head portion 353 is also provided with means forming an air control for nozzle assembly 318; such air control means is provided in bore 400 which includes a valve seat 401 and a threaded portion 402. As shown in FIG. 11, a valve member 401a threaded into bore 400 can be used to adjust the flow of compressed air from passageway 387 through valve seat 401 into passageway 388.

FIG. 13 also illustrates opening 383 through which the resin-catalyst mixture flows into cavity 382. As shown in FIG. 13, cavity 382 is provided with a threaded fitting 403 which includes a central passageway 404 in communication with cavity 382 and a plurality of passageways 405 and 406. When threaded fitting 403 is threaded into head portion 353, fitting 403 compresses O-ring seals 407 and 408 against head portion 353 and forms an annular air chamber 409 between head portion 353 and fitting 403 and seals the interface between cavity 382 and passageway 404 and the interface between passageway 388, annular air chamber 409, and passageways 405 and 406.

Nozzle assembly 318 is attached to the head portion 353 of spray gun 317 with a threaded nut 410.

In operation, spraying means 313 provides an expanding flow of mixed resin and catalyst which may be directed by the system operator onto a substrate 14, which may be a mold or preform used to manufacture articles of varied shape. Spraying means 313, assembled as shown in FIG. 13, is used without a chopper to form a smooth, catalyzed resin film on substrate 14. Such smooth, non-reinforced resin films are frequently referred to as being a "gel coat" and provide a smooth article surface. When spraying means 313 is used to spray "gel coat", the nozzle assembly 318 provides a vertically oriented spray pattern. If further strength is required in the manufactured article, spraying means 313 may be operated with a chopper to introduce, into the catalyst-resin spray, reinforcing fibers of selected length into a layer of catalyzed resin deposited over the "gel coat" on the substrate. These fibers are preferably chopped fiberglass as described above. Upon completion of each use and before allowing spraying means 313 to be idle for any significant time, the interior passageways of spraying means 313 exposed to mixed resin and catalyst are flushed with solvent from solvent source 368. A small, manually operated valve 369a can be mounted on the rear of spraying gun body 317 to permit convenient control of the solvent flush by the gun operator.

As set forth above, FIG. 13 is a cross-sectional view of head portion 353 of spraying means 313 with nozzle assembly 318 attached. The cross-sectional view of FIG. 13 is viewed at a vertical plane through the center of nozzle assembly 318. Nozzle assembly 318 includes an airless liquid resin nozzle 330 and an air nozzle 340. Liquid nozzle 330 forms the resin flow into a fan-like film with expanding edges extending from a liquid orifice 331 formed in nozzle 330. Air nozzle 340 forms a controlled flow of air through a plurality of air orifices 341a, 341b and a controlled flow of in air from a plurality of nozzles 342a and 342b (see FIGS. 13 and 14B) Nozzles 342a and 342b form the compressed air flowing therefrom into an air stream having greater width than thickness. Nozzle assembly 318, including liquid nozzle 330 and air nozzle 340, forms a resin-catalyst mixture having a spray pattern which has a uniform distribution of spray throughout the pattern along its longitudinal axis and without escaping catalyst particles. The spray pattern is substantially smaller than the spray patterns obtained with prior systems and may be conveniently used by an operator of spraying means 313 to provide a uniform, catalyzed, resin film on a substrate, mold, or preform.

FIG. 13 shows how nozzle assembly 318 is assembled onto head portion 353 of spray gun body 317. As shown in FIG. 13, spray nozzle 330 is held onto head portion 353 of the spray gun body by air nozzle 340 and a threaded retainer nut 410. Retainer nut 410 includes a threaded portion 411 at its rear which threads onto a threaded portion 353a at the forward end of head portion 353. At its forward portion, retainer nut 410 forms an inwardly projecting flange 410a which engages the front face 343 of air nozzle 340, urging it rearwardly and tightly against the front face of threaded member 403 of the spray gun body. Air nozzle 340 is formed with a central opening 344 which is shaped to include two, flat surfaces 344a and 344b (see FIG. 15). Opening 344 fits around liquid nozzle 330. A rearwardly facing flange 345 is formed around central opening 344; and as the retaining nut 410 is threaded onto the head portion 353 of the spray gun and its rearwardly facing flange 410a engages the front face 343 of air nozzle 340 and urges air nozzle 340 rearwardly, flange 345 of air nozzle 340 presses liquid nozzle 330 rearwardly into engagement with sealing means 411 and threaded member 403. As shown in FIG. 13, sealing means 411 is preferably formed with a forward portion of reduced diameter to fit within an enlarged cavity 330b at the rear of liquid nozzle 330. Sealing means 411 can thus be sealingly engaged between liquid nozzle 330 and threaded member 403. Thus, as retaining nut 410 is threaded onto head portion 353 of the gun body, it simultaneously fastens the air nozzle 340 and liquid nozzle 330 to head portion 353 of the gun and provides an effective seal between liquid nozzle 330 and air nozzle 340 and, by means of seal means 411, between liquid nozzle 330 and threaded member 403. Body portion 403 comprises a generally cylindrical-shaped component of aluminum or stainless steel having a central passageway 404 extending from its front face longitudinally into, but not through, its body.

When trigger 354 is pulled rearwardly, opening the valve assemblies, the resin-catalyst mixture flows under the influence of pressure imparted by pumps 323 and 325 through opening 383, cavity 382, passageway 404 annular cavity 358, sealing means 411, liquid nozzle 330, and opening 331 therein. Liquid nozzle 330, an airless atomizing nozzle, includes an interior passageway formed to force the resin to flow into a fan-like film with expanding edges extending forwardly from liquid orifice 330a.

Figure 10:
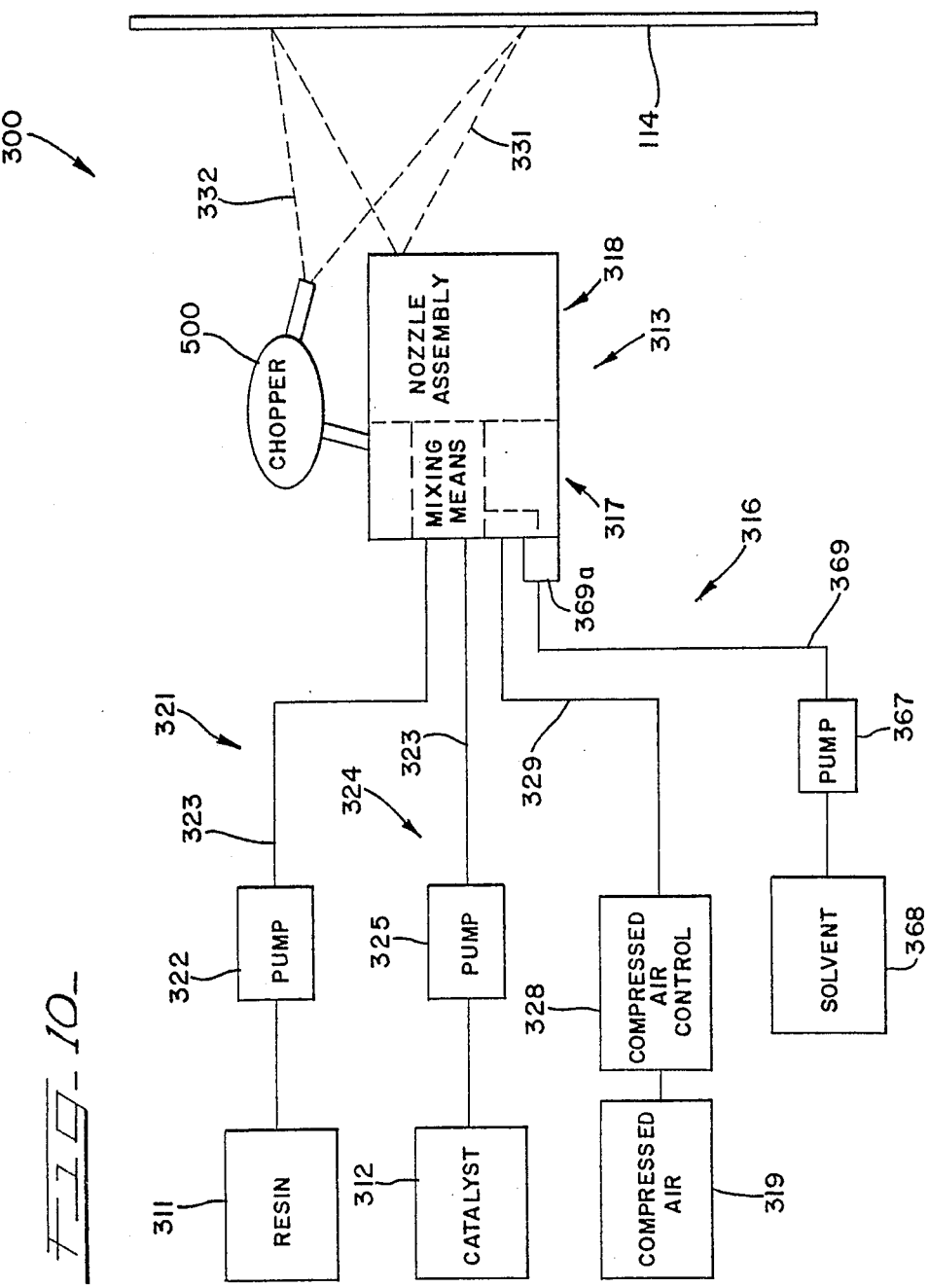
FIG. 10 schematically illustrates an internal mix, air-assisted, plural component system of this invention.

Threaded member 403, when in place in cavity 382 formed in head portion 353 of the spray gun, also forms an air passage to deliver a flow of compressed air to the plurality of air orifices in the front of the air nozzle 340. As shown in FIG. 13, when air nozzle 340 is attached to the spray gun, a second annular air chamber 412 is formed between the forward face of threaded member 403 and air nozzle 340. Threaded member 403 includes a plurality of passageways (405, 406, FIG. 13), preferably four, extending forwardly from its rear face at the first annular air chamber 409 to its forward end where the plurality of passageways (405, 406) opens into the second annular air chamber 412 formed between threaded member 403 and air nozzle 340. A plurality of air passageways extends from the rear air nozzle surface that communicates with the second annular air chamber 412 to orifices 341a and 341b and nozzles 342a and 342b at the front face 343 of air nozzle 340. Compressed air, which is controlled by a valve assembly in spray gun body 317, is directed through passageways which are not shown in spray gun body 317 to the interface between head portion 353 and the front portion of spray gun body 351. As shown in FIG. 13, when trigger 354 is operated, the compressed air flows from source 319 and compressed air control 328 (FIG. 10) through conduit 329, opening 362, passageways 371 and others in gun body 317 (not shown), passageways 386, 387, and 388, the first annular air chamber 409, the plurality of passageways 405, 406, the second air chamber 412, passageways 341c and 341d formed in air nozzle 340 and from the plurality of nozzles 342a and 342b.

Thus, as shown in FIGS. 13, 14A and 14B, compressed air flows through annular air chamber 412 into passageways 394, 395a, and 396a (see FIGS. 14B and 15) drilled into the main body of air nozzle 340. Passageways 395a and 396a intersect within the body of spray nozzle 340 with passageway 394 and are closed at the peripheral surfaces of the body. As shown in FIG. 14B, compressed air is directed via passageways 397a and 398a which intersect passageways 395a and 396a, respectively, to the plurality of air nozzles 342a and 342b. Air nozzles 342a and 342b direct an expanding air stream at the expanding, fan-like flow of resin and catalyst from the liquid nozzle 330 which is positioned in central opening 344, as described below. Central opening 344 of nozzle assembly 340 includes two flattened portions 344a and 344b (see FIG. 15) to ensure that nozzle assembly 340 is properly aligned with airless nozzle 330. Compressed air thus flows through passageways 394, 395b, and 396b to passageways 397b and 398b, respectively, and to air nozzles 342a and 342b and through passageways 341c and 341d. Air nozzles 342a and 342b may be pressed into the body of nozzle assembly 340 or may be fastened therein by any convenient fastening method.

Nozzle assembly 340 surrounds airless nozzle 330 that preferably forms a fan-like film with an included angle R of 40°–50°; and the airless nozzle is located within opening 344 at the longitudinal center line of nozzle assembly 340. Air nozzles 342a and 342b formed by the nozzle assembly are located on a plane that is perpendicular to and bisects the expanding, fan-like liquid film formed by the airless nozzle. Air nozzles 342a and 342b are oriented to direct their expanding flow of compressed air at an acute, included angle a with respect to the expanding, fan-like liquid film and impinge upon the expanding fan-like film at a distance of from about five-tenths to about eight-tenths of an inch forwardly of the orifice of the airless nozzle. Such orientation prevents a troublesome accumulation of particles on the airless nozzle. In the embodiments illustrated in FIGS. 14 and 15, air nozzles 342a and 342b can be equally spaced from the center line of the liquid orifice of the airless nozzle by a distance c of about three-eights of an inch to about one-half of an inch and directed to form equal acute included angles a of about 25 to about 35 degrees with respect to a plane containing the expanding fan-like liquid film.

The flow of compressed air in the illustrated embodiments of FIGS. 14 and 15 is also formed by two passageways 341c and 341d parallel to both the longitudinal axis of a nozzle assembly and to each other. Two passageways 341c and 341d are equally spaced from the central axis of the airless resin nozzle a distance e of about three-tenths to about four-tenths of an inch and lie in the plane that perpendicularly bisects the plane through the center of the catalyst spray nozzles. Where in one preferred embodiment using a resin nozzle with a nominal included angle R of 40°–50°, the distance c was about 0.0458 inch; the angle a was about 30°; and the distance e was about 0.375 inch.

In addition, as shown in FIG. 14A, a pair of cavities 346a and 346b may be formed in the front face 343 of nozzle assembly 340 around air orifices 341a and 341b, respectively. Cavities 346a and 346b are formed in the front face 343 in such a manner that they extend inwardly at an acute angle with respect to air passageways 341c and 341d, respectively, but in such a manner that there are no surfaces forwardly of the air orifices 341a and 341b that lie within the imaginary extension of the air passageways 341c and 341d. Cavities 346a and 346b tend to form low-pressure areas adjacent the air orifices 341a and 341b which "soften" the edges of the compressed air jets projected from orifices 341a and 341b as the compressed air jets extend forwardly from the front face 343 of the air-catalyst nozzle. The acute angle j formed by the central axis of cavities 346a and 346b and the longitudinal axis of air passageways 341c and 341d may vary; with the specific embodiment described above, effective operation can be obtained with cavities 346a and 346b lying at an angle j equal to about 20 degrees if the cavities have a diameter of about 0.138 inch and a depth of about 0.118 inch; and the diameter of air passageways 341c and 341d is about 0.062 inch.

In the absence of the flow of compressed air which characterizes this invention, the spray pattern of the liquid from an airless nozzle 330 includes a central portion having a high ratio of length to width and tapering ends, and two end portions at each edge of the pattern characterized by almost circular cross-sections and a heavy deposition of resin material. The air of this embodiment directed at the fan-like resin film from air nozzles 342a and 342b, in the absence of the compressed air flows from orifices 341a and 341b, substantially widens the spray pattern, increasing the ratio of length to width of the central portion without diminishing the concentration of liquid deposition at the end portions of the pattern and, further, results in an air billowing which carries fine resin-catalyst particles away from the spray pattern into the surrounding environment. With the flow of compressed air from orifices 341a and 341b directed at the expanding edges of the fan-shaped liquid film downstream of the impingement of the air from nozzles 342a and 342b, the uncontrolled billowing of air and escaping particles is eliminated and a surprising improvement in the size and uniformity of the spray pattern results.

FIGS. 14A and 14B present an illustration of the arrangement of compressed air nozzles of air nozzle 340. The liquid nozzle forms the resin into a fan-like film having expanded edges forming an angle R, shown in FIG. 14A; in the preferred embodiments, R equals about 40 to 50 degrees. Air passageways 341c and 341d lie preferably along axes parallel to each other and perpendicular to front face 343 of air nozzle 340. The central axes of air passageways 341c and 341d are displaced from the center line of nozzle assembly 340 and the liquid orifice 33 at such a distance that the center axes of the passageways 341c and 341d intersect the expanding edges of the liquid film that form the included angle R downstream of the intersection of the air spray from air spray nozzles 342a and 342b. Thus, for preferable operation, the distance e (the separation between the center line of air passageways 341c and 341d from the center line of liquid orifice 331) divided by the tangent of one-half of the angle R (the included angle formed by the expanding fan-like liquid film) is greater than the distance c (the separation between the center line of the air spray nozzle orifices and the center line of liquid orifice 331) divided by the tangent of a (the acute angle between a line parallel to the central axis of airless nozzle 330 and the center axes of air nozzles 342a and 342b. In mathematical terms:

$$\frac{e}{\tan \frac{R}{2}} > \frac{c}{\tan a}$$

In systems of the invention, the flow of compressed air is thus directed at the fan-like liquid film closely adjacent (i.e., directly at or a fraction of an inch in front of) the airless nozzle and at the expanding edges of the fan-like film downstream of the impingement of the air on the liquid film.

Such systems provide substantially improved spray patterns. Systems of this invention are less expensive to manufacture, operate, and maintain and are easier and safer to use through their improved spray patterns, and permit reductions of resin hydraulic pressure and compressed air pressure and more effective use of compressed air. Such system can provide improved operation with resin pressures substantially less than 500 psi and with air pressures of about 30 psi and less.

While what has been described constitutes a presently most preferred embodiment, the invention can take many other forms. Accordingly, it should be understood that the invention is to be limited only insofar as is required by the scope of the following claims.

I claim:

1. Means for forming a coating from a catalyzed, resinous material, comprising:
   a first source of resin;
   a second source of catalyst for said resin;
   spraying means to mix said catalyst with said resin and to direct mixed catalyst and resin at a substrate;
   liquid delivery means to provide a flow of resin from said first source to said spraying means;
   air delivery means to provide a flow of compressed air to said spraying means; and
   injection means to introduce catalyst in said air delivery means,
   said spraying means comprising a liquid nozzle for forming the resin flow into a fan-like resin film with expanding edges extending from a liquid orifice, and a nozzle for directing compressed air and catalyst particles at the fan-like resin film with no air-directing means between said liquid nozzle and compressed air-catalyst nozzle,
   said liquid nozzle and said nozzle being adapted so that the compressed air and catalyst particles interact with the fan-like resin film and its expanding edges to provide a spray pattern with mixed catalyst and resin particles uniformly distributed throughout the spray pattern.

2. The means of claim 1 wherein said injection means comprises a fluid valve and mixing assembly coupled to said second source of catalyst and to said air delivery means for introducing catalyst into said compressed air, and wherein said air delivery means includes means for coupling said fluid valve and mixing assembly to said spraying means to provide a flow of compressed air and catalyst particles to said spraying means.

3. The means of claim 1 wherein said spraying means comprises a hand-held spray gun with a chopper.

4. The means of claim 1 wherein said nozzle directs compressed air and catalyst particles at the fan-like film closely adjacent to the liquid nozzle.

5. The means of claim 4 wherein said nozzle directs compressed air and catalyst particles from around the liquid nozzle.

6. The means of claim 4 wherein said nozzle further directs a flow of compressed air to substantially confine the mixed catalyst and resin particles downstream of the interaction of the compressed air and catalyst particles with the fan-like resin film.

7. A plural component spraying system, comprising:
   a first source of first component;
   a second source of second component;
   spraying means for directing mixed first and second components at a substrate;
   liquid delivery means for providing a flow of said first component from said first source to said spraying means and for providing a flow of said second component from said second source to said spraying means;
   a source of compressed air;
   air delivery means for providing a flow of compressed air from said compressed air source to said spraying means; and
   mixing means for mixing said first and second components to provide a mixture of said first and second components for atomization,
   said spraying means including an airless liquid nozzle for forming the mixture of first component and second component into a fan-like film with edges extending from a liquid orifice, and a nozzle assembly for directing a first flow of compressed air to impinge on the fan-like film closely adjacent to the airless liquid nozzle and assist in the formation of a particle spray and for further directing a second flow of compressed air to substantially confine the particle spray downstream of the impingement of the first flow of compressed air, said first and second flows of compressed air interacting with the fan-like film of mixed first and second components to assist atomization and capture the particles of the mixture.

8. The system of claim 7 wherein said first component comprises a resinous material and said second component comprises a catalyst for said resinous material.

9. The plural component spraying system of claim 7 wherein said first flow from said nozzle assembly comprises two flows of compressed air directed from opposite sides of fan-like film, and said second flow of compressed ;air comprises two flows of compressed air directed at the expanding edges of the fan-like film downstream of the impingement of the first flows to assist in the formation of and substantially confine the particle spray.

10. The system of claim 9 wherein the nozzle assembly comprises:
    a nozzle body having a central opening at its longitudinal center line in which the airless liquid nozzle is positioned;
    a pair of air nozzles equally spaced on opposing sides of the longitudinal center line of the nozzle body for directing expanding first flows of compressed air at the planar surfaces of the fan-like resin film; and
    a pair of air orifices being equally spaced on opposing sides of the longitudinal center line of the nozzle body and located on a line that perpendicularly bisects the line between the pair of air nozzles, for directing said second flows of compressed air at the expanding edges of the fan-like resin film,
    said air nozzles being oriented to direct the first flows of compressed air to intersect the longitudinal center line of the nozzle body a fraction of an inch in front of the nozzle body, and
    said air orifices being positioned to direct the second flows of compressed air downwardly of the nozzle body and generally parallel to its longitudinal center line.

11. The system of claim 7 wherein said spraying means includes mixing means upstream of said airless liquid nozzle.

12. A method of forming a coating form a plurality of mixed components, comprising:
    delivering a flow of a first component to a spraying means;

delivering a flow of compressed air to said spraying means;

introducing a second component into the flow of compressed air to said spraying means;

forming the first component flow into a fan-like film with expanding edges extending from the spraying means;

directing the flow of compressed air and second component at the fan-like film of said first component in the absence of a directed flow of compressed air between said fan-like film and said flow of compressed air and second component;

atomizing the first component and mixing the first component and second component with the flow of compressed air; and directing the atomized and mixed first and second components at a substrate where the first and second mixed components harden to form a coating.

13. The method of claim 12 wherein the flow of compressed air and atomized catalyst particles is concentrated adjacent the expanding edges of the fan-like resin film to provide assistance in the atomization of the expanding edges of the resin film and to provide a greater concentration of catalyst particles adjacent the expanding edges of the resin film for more uniform mixing of resin and catalyst.

14. The method of claim 12 wherein said introducing step comprises introducing catalyst particles into the flow of compressed air externally of said spraying means, and said compressed air delivering step comprises delivering a flow of compressed air having catalyst particles mixed therein to said spraying means.

15. The method of claim 12 wherein said spraying means comprises a hand-held spray gun, and said directing step comprises sweeping said spray gun over said article forming substrate.

16. The method of claim 12 wherein the first component is a resin and the second component is a catalyst for the resin.

17. The method of claim 12 further characterized by directing the flow of compressed air and second component at the fan-like film closely adjacent the spraying means.

18. The method of claim 12 further comprising the step of directing a further flow of compressed air to substantially confine the atomized and mixed first and second components downstream of the fan-like film.

19. A nozzle for use with an airless spray nozzle in a plural component system, comprising:

a body forming an opening in its face permitting the body to be positioned adjacent an airless spray nozzle that is adapted to project plural component material in a plane forwardly of the body, said body having a plurality of nozzle means to direct flows of compressed air forwardly of the body in a direction to intersect the plane of the plural component material projected from the airless spray nozzle a fraction of an inch forwardly of the face of the body, and a plurality of means to direct flows of compressed air forwardly of the body, generally parallel to each other and generally in the plane of the plural component material projected from the airless spray nozzle.

20. The nozzle of claim 19 wherein said plurality of nozzle means to direct flows of compressed air comprises a pair of air nozzles centered upon and equally spaced on opposite sides of the body opening and oriented at an acute angle in the face of the body, said air nozzles forming the flows of compressed air therefrom into an expanding stream having greater width than depth.

21. The nozzle of claim 20 wherein said plurality of means to direct flows of compressed air forwardly of the body comprises a pair of passageways centered upon and equally spaced on opposite sides of the body opening and further being generally equally spaced from each of the pair of air nozzles.

22. The nozzle of claim 21 wherein each of said pair of passageways is surrounded by a cavity at the front face of the nozzle.

23. The nozzle of claim 22 wherein each cavity is formed in such a manner that it includes a wall extending at an acute angle with respect to the passageway it surrounds.

24. A method of forming a coating from a plurality of mixed components, comprising:

delivering a flow of a first component to a spraying means;

delivering a flow of second component to said spraying means;

delivering a flow of compressed air to said spraying means;

mixing said first component and said second component and forming the mixture of first and second component into a fan-like film with expanding edges extending from the spraying means;

dividing the flow of compressed air into two air flows having greater width than depth and directing said two air flows at the fan-like film of said mixture from opposite sides of the film within a fraction of an inch of the spraying means;

further dividing the flow of compressed air into two substantially parallel air jets directed at the expanding edges of the fan-like film downstream of intersection of the expanding air flows, said mixture being formed into a spray pattern with particles of mixed first and second components substantially contained in said spray pattern; and directing the spray particles at a substrate where the first and second mixed components harden to form a coating.

25. The method of claim 24 wherein said first component and said second component are mixed within said spraying means.

26. Means for forming an article from a catalyzed, resinous material, comprising:

a first source of resin;

a second source of catalyst for said resin;

spraying means to mix said catalyst with said resin and to direct mixed catalyst and resin at an article-forming substrate;

liquid delivery means to provide a flow of resin from said first source to said spraying means;

air delivery means to provide a flow of compressed air to said spraying means; and injection means for introducing catalyst into said flow of compressed air comprising a fluid valve and mixing assembly coupled to said second source of catalyst and to said air delivery means for introducing catalyst into said compressed air, said air delivery means comprising means for coupling said fluid valve and mixing assembly to said spraying means to deliver a flow of compressed air and catalyst particles to said spraying means, said spraying means comprising a liquid nozzle for forming the resin flow into a fan-like resin film with expanding edges extending from a liquid orifice, and a nozzle directing compressed air and catalyst particles at the fan-like resin film, said liquid nozzle and said nozzle being adapted so that the compressed air and catalyst particles interact with the fan-like resin film and its expanding edges to provide a spray pattern with mixed catalyst and resin particles uniformly distributed throughout the spray pattern.

27. A method of forming a coating from a plurality of mixed components, comprising:

delivering a flow of a first component to a spraying means;

delivering a flow of a second component to said spraying means;

delivering a flow of compressed air to said spraying means;

mixing said first component and said second component and forming the mixture of said first and second components into a fan-like film with expanding edges extending from the spraying means;

directing a first flow of compressed air having greater width than depth to intersect the fan-like film of said mixture within a fraction of an inch of the spraying means to assist in the formation of a particle spray;

further directing a second flow of compressed air to substantially confine the particle spray downstream of intersection of the expanding air flow and fan-like film, said particle spray of mixed first and second components being substantially confined in a spray pattern of reduced size; and directing the spray particles at a substrate where the first and second mixed components harden to form a coating.

* * * * *

UNITED STATES PATENT AND TRADEMARK OFFICE
CERTIFICATE OF CORRECTION

PATENT NO. : 4,967,956

DATED : November 6, 1990

INVENTOR(S) : Gregory A. Mansfield

It is certified that error appears in the above-identified patent and that said Letters Patent is hereby corrected as shown below:

In Col. 13, line 29, delete "114" and insert therefore --14--.

In Col. 20, line 14, delete "extending" and insert therefore --expanding--.

In Col. 20, line 33, delete ";air" and insert therefore --air--.

In Col. 20, line 59, delete "downwardly" and insert therefore --forwardly--.

In Col. 20, line 65, delete "form" and insert therefore --from--.

Signed and Sealed this

Twelfth Day of May, 1992

Attest:

DOUGLAS B. COMER

*Attesting Officer*  *Acting Commissioner of Patents and Trademarks*